United States Patent
Brown, Jr.

[11] Patent Number: 5,690,760
[45] Date of Patent: Nov. 25, 1997

[54] PITCH SEQUENCE

[76] Inventor: Jack Edward Brown, Jr., 936 Merriman Rd., Akron, Ohio 44303

[21] Appl. No.: 608,094

[22] Filed: Feb. 28, 1996

Related U.S. Application Data

[63] Continuation of Ser. No. 263,154, Jun. 20, 1994, abandoned, which is a continuation of Ser. No. 13,264, Feb. 3, 1993, abandoned.

[51] Int. Cl.$^6$ .................. B60C 107/02; B60C 113/00; B60C 121/00
[52] U.S. Cl. .................. 152/209 R; 152/209 B
[58] Field of Search .................. 152/209 R, 209 B, 152/209 D

[56] References Cited

U.S. PATENT DOCUMENTS

| | | | |
|---|---|---|---|
| 1,956,011 | 4/1934 | Evans | 152/209 R |
| 4,178,199 | 12/1979 | Lippmon et al. | 152/209 R |
| 4,474,223 | 10/1984 | Landers | 152/209 R |
| 4,721,141 | 1/1988 | Collette et al. | 152/209 R |
| 4,823,853 | 4/1989 | Hitzky | 152/209 R |
| 5,337,816 | 8/1994 | Bonko et al. | 152/209 R |

FOREIGN PATENT DOCUMENTS

| | | | |
|---|---|---|---|
| 438108 | 7/1991 | European Pat. Off. | 152/209 R |
| 0008904 | 1/1980 | Japan | 152/209 D |
| 45402 | 3/1985 | Japan | 152/209 B |
| 82408 | 5/1985 | Japan . | |
| 2237804 | 9/1990 | Japan | 152/209 R |

OTHER PUBLICATIONS

Richards, "Automotive Tire Noise–A Comprehensive Study", Sound and Vibration, May 1974, pp. 42–47.

*Primary Examiner*—Steven D. Maki

[57] ABSTRACT

The present invention relates to a tire having a tread comprising at least 33 repeating design cycles placed continuously about the circumference of the tire wherein the design cycles have a total of three different cycle lengths including a short length (S), a medium length (M) and a long length (L) wherein the pitch sequence is MSSSLMMSMLLM-LLLMSMSSSMSLLLMMMSSSS.

3 Claims, 1 Drawing Sheet

PITCH SEQUENCE

This is a continuation of application Ser. No. 08/263,154, filed on Jun. 20, 1994, now abandoned which is a continuation of Ser. No. 08/013,264, filed on Feb. 3, 1993 now abandoned.

BACKGROUND OF THE INVENTION

The present invention relates to tire treads, and more specifically relates to tire treads in which the length of repeating design cycles or pitches are modulated in order to reduce lug impact frequency when the tire rolls on a hard surface. In the past, tire treads for tires used with large equipment have been designed by using repeating design cycles extending circumferentially about the periphery of the tire. In most such tire treads, a single design cycle or pitch is repeated. However, some prior designers have proposed using different number of design cycles or pitches on the tire tread circumference.

SUMMARY OF THE INVENTION

Experience has shown that the preceding prior proposal results in undesirable lug impact frequency. Lug impact frequency is a phenomenon of the pitching of the tire and the speed of the vehicle resulting in a vibration or surging in the vertical and horizontal directions. This vibrating or surging is known in the industry as tread lug-induced vibration. The inventor has discovered that it is possible to selectively reduce the impact frequency by using a randomized sequence of pitches or design cycles on the tire. According to the preferred practice of the invention, a 33 random pitched sequence is used to provide a tread pattern having a complimentary Fourier spectra, such that the total energy generated by the rolling tire is spread as uniformly as possible over the frequency spectrum.

DESCRIPTION OF THE DRAWING

These and other advantages and features of the invention will hereinafter appear for purposes of illustration, but not of limitation, in connection with the accompanying drawing in which like numbers refer to like parts throughout, and wherein.

DESCRIPTION OF THE PREFERRED EMBODIMENT

Figure 1:
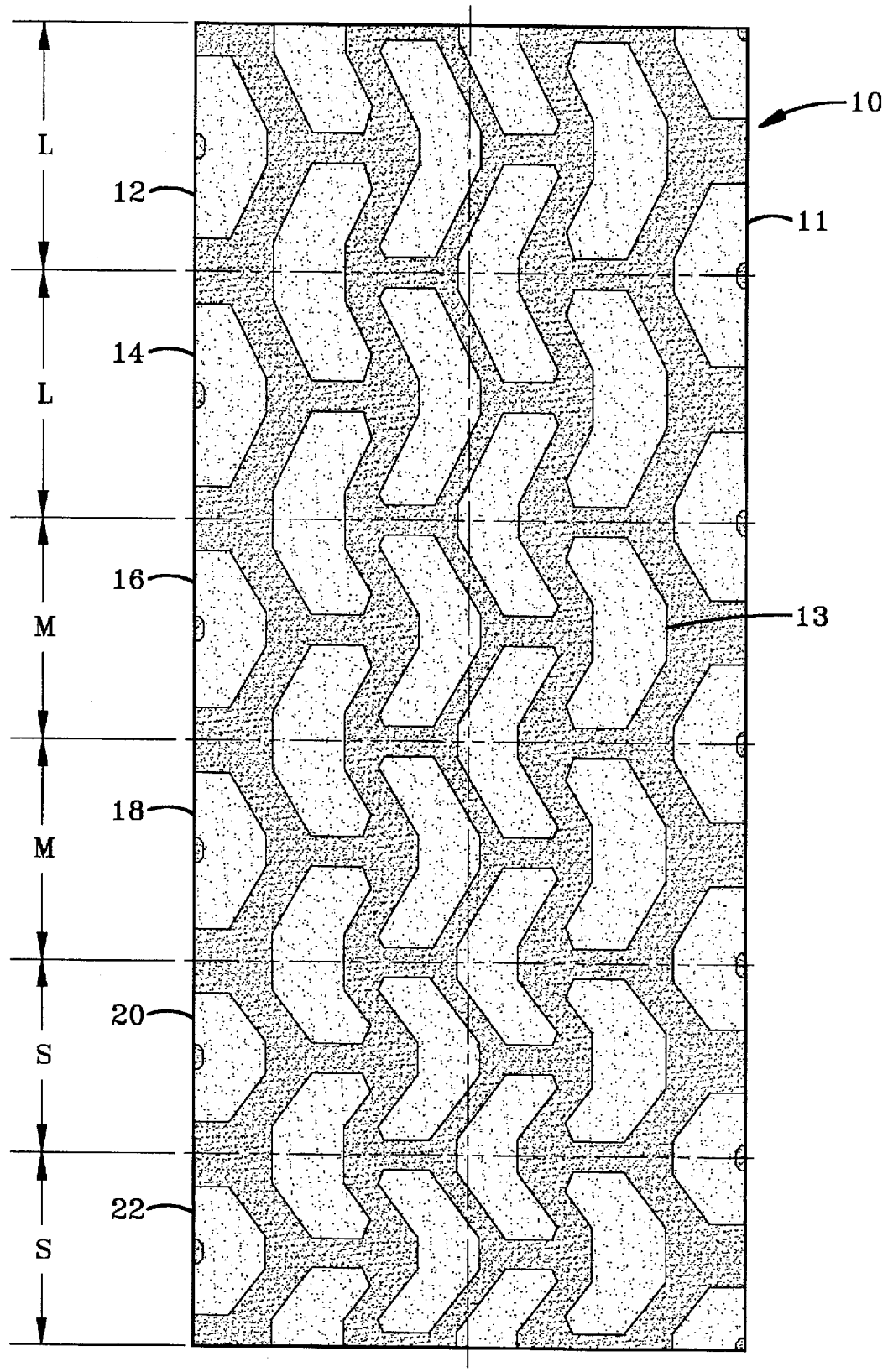
FIG. 1 is a schematic representation of a portion of the design cycles or pitches of a preferred tire made in accordance with the invention projected onto a flat surface.

FIG. 1 shows a portion of an exemplary tire 10 having a tread with an outer surface 11 with lug tread elements 13. Exemplary tread design cycles, such as 12–22 extend around the circumference of the tire. The design cycles are defined with respect to being perpendicular to the axis of rotation of the tire. According to the preferred practice of the invention, 33 pitches are used. Three different pitch lengths are used having the ratio 9:10:11. When the letters S, M and L are used to designate the small, medium and large pitch lengths, the pitch sequence is as follows:

MSSSLMMSMLLMLLLMSMSSSMSLLLMMMSSSS, where S, M and L are the small, medium and large pitch lengths, respectively. A preferred tire of the present invention is 16.00 R25, wherein the length of the small pitch is 127.99 mm, the length of the medium pitch is 142.21 mm and the length of the long pitch is 156.44 mm.

Those skilled in the art will appreciate that the foregoing sequence is chosen to have a desirable Fourier spectra. That is, the total vibrational energy is spread as uniformly as possible over the frequency spectrum when the tire is rotated over a road surface.

It is possible to predict the frequency spectrum that will be generated by the sequences of the tire. Those skilled in the art recognize that computer programs capable of such prediction are available and in use. By using the computer program to predict the frequency spectrum, the total sound energy is spread as uniformly as possible over the frequency spectrum.

Those skilled in the art will recognize that the embodiments described herein may be modified and altered without departing from the true spirit and scope of the invention as defined in the appended claims.

What is claimed is:

1. A tire having a tread containing lug tread elements and comprising repeating design cycles placed continuously about the circumference of said tire in a pitch sequence wherein said tread has only 33 repeating design cycles, said design cycles having a total of three different design cycle lengths including a short length (S), a medium length (M) and a long length (L) wherein the pitch sequence is MSSSLMMSMLLMLLLMSMSSSMSLLLMMMMSSSS and wherein the three design cycle lengths have a ratio of 9:10:11.

2. The tire of claim 1 wherein the length of the short pitch is about 127.99 mm, the length of the medium pitch is about 142.21 mm and the length of the long pitch is about 156.44 mm.

3. The tire of claim 1 wherein the tire is a 16.00 R25.

* * * * *